April 4, 1939.          H. CAMINEZ                2,152,681
                     SCREW CONNECTION
            Filed Dec. 20, 1938          2 Sheets-Sheet 1

INVENTOR.
HAROLD CAMINEZ
BY Walter S. Olustein
ATTORNEY.

April 4, 1939. H. CAMINEZ 2,152,681
SCREW CONNECTION
Filed Dec. 20, 1938  2 Sheets-Sheet 2

INVENTOR.
HAROLD CAMINEZ
BY Walter S. Blustein
ATTORNEY.

Patented Apr. 4, 1939

2,152,681

UNITED STATES PATENT OFFICE 2,152,681

SCREW CONNECTION

Harold Caminez, Kew Gardens, N. Y., assignor to Aircraft Screw Products Company, Inc., New York, N. Y., a corporation of New York Application December 20, 1938, Serial No. 246,814

10 Claims. (Cl. 85—46)

This invention relates to high strength screw fastenings of the type disclosed in my copending application Serial No. 190,168, filed February 12, 1938, of which this application is a continuation-in-part.

In the said application Serial No. 190,168, I have described a female member with an internal V-shaped thread, a male member with an external segment-shaped thread, and a wire coil insert for engagement with the threads of both said female and said male members.

The present invention contemplates improvements of the mechanical and thermal properties of a screw connection of the said type by providing such structural and dimensional relations of the interconnecting parts and by suitable control of the physical properties of the materials employed that certain desirable deformations are obtained when a tight fitting screw is assembled into a threaded hole.

Another object of the invention is to provide a screw connection which will adequately withstand the strains due to high pressure and temperature, which will allow good thermal contact between the interconnected members, which will permit repeated insertion and removal of the male threaded member without wear of the thread surface in the female threaded member, which will resist seizing or welding of the mated threaded parts that might prevent the subsequent removal of the male threaded member, and which will adequately resist electrolytic influences that tend to cause destructive corrosive effects in service.

As the screw connection of a spark plug to an aluminum cylinder of an internal combustion engine constitutes one of the cases where the above properties of my screw connection are particularly desirable, I shall hereinafter describe my invention with reference thereto. It is to be understood, however, that I do not desire to limit my invention to spark plugs, but that it is applicable without departing from the scope of the appended claims wherever the circumstances and the conditions require or justify the use of a high strength screw fastening.

Further objects and details of my invention will be apparent from the description hereinafter and the accompanying drawings showing an embodiment thereof by way of example.

Figure 2:
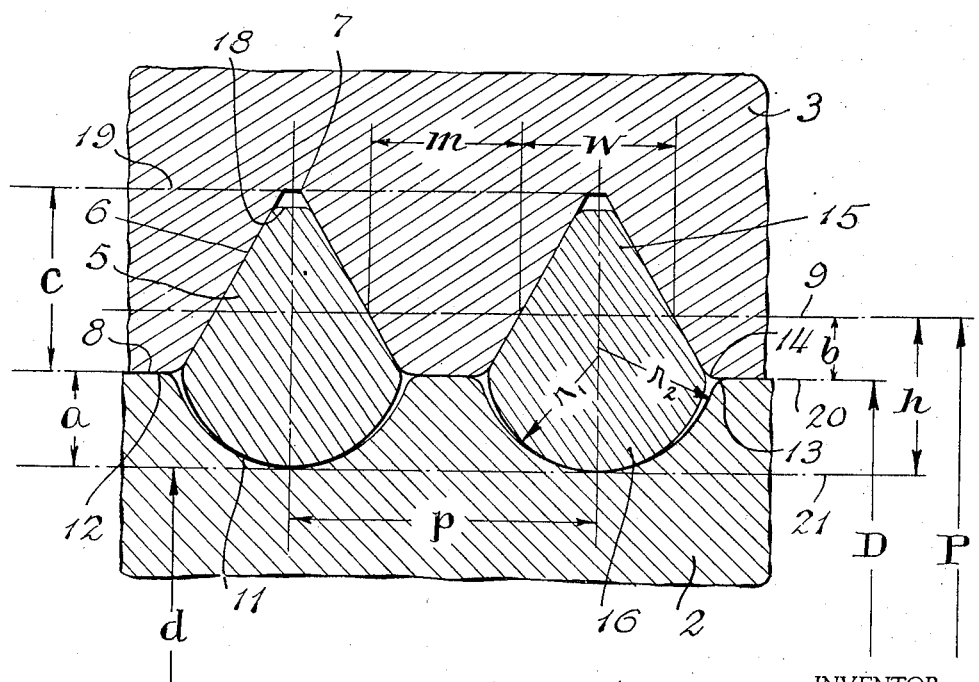
Fig. 2 is a cross-sectional view on a larger scale of a portion thereof.
Figure 4:
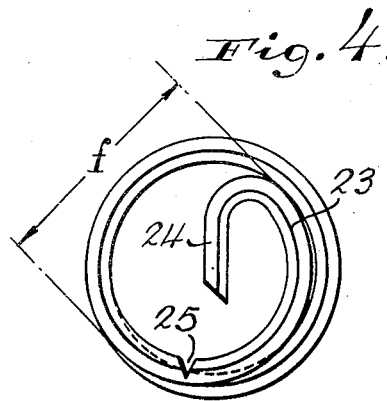
Figs. 4 and 5 are plan views of the first or entering convolution and of the trailing convolution respectively of the coil shown in Fig. 3.
Figure 3:
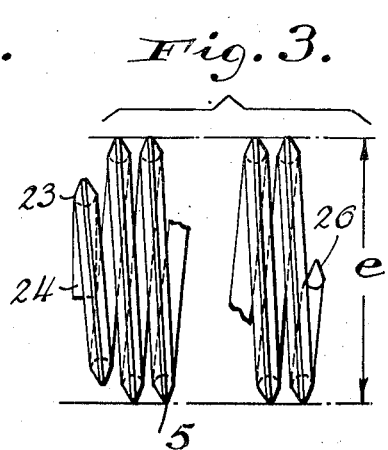
Fig. 3 is a side elevation of the wire coil used in the connection shown in Fig. 1.
Figure 5:
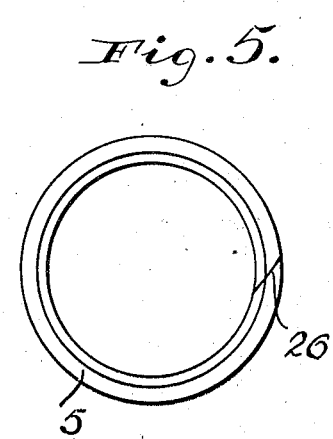
Figure 6:
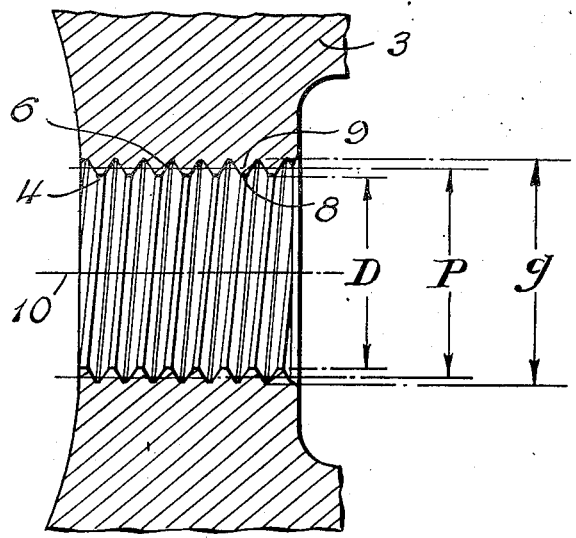
Fig. 6 is a section through the tapped hole before assembling the wire coil.
Figure 7:
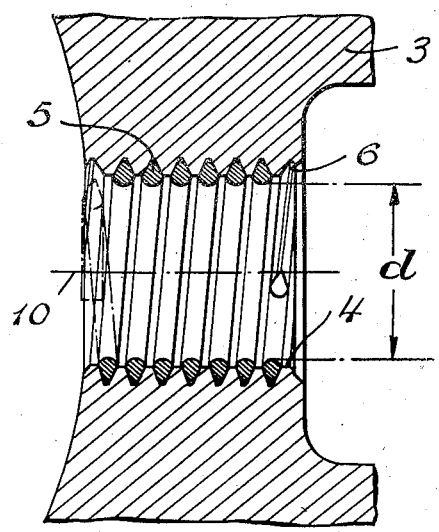
Fig. 7 shows the tapped hole with the wire coil assembled in place.

Referring now to the drawings, I is a spark plug comprising a threaded body 2 which forms the male member of its screw connection according to the invention. The female member thereof is constituted by an engine cylinder 3 provided with a hole 4. A wire coil or insert 5 is screwed into the thread 6 tapped in the wall of the hole 4, and the male member 2 is screwed into the convolutions of the wire coil 5. The cross-section of the thread 6 has the shape of an equilateral triangle and it may be provided with a small truncated apex 7 at the bottom of the thread, as clearly shown in Fig. 2. Succeeding convolutions of thread 6 are spaced from each other by the lands 8. I denote as the pitch diameter $P$ of the thread 6 the diameter of that cylinder 9 about the axis 10 on which the width $w$ of the thread space is equal to the width $m$ of the material between two consecutive convolutions of the thread, the pitch $p$ being the distance between similar points of consecutive convolutions. The thread 11 of the male mmeber 2 has the same pitch as that of the female member; however, it is much shallower than the latter, and its cross-section has the shape of the segment of a circle, the height $a$ of the segment being about 80% of the radius $r_2$ of the circle. Lands 12 are left between consecutive convolutions of the thread 11 opposite the lands 8 of the female member. The corners 13 and 14 of the lands 12 and 8 respectively, may be rounded off: for reasons stated hereinafter.

The wire coil or insert 5 is so shaped as to fit snugly between the thread walls of the female member. Its cross-section constitutes a truncated equilateral triangle 15 on a segment-shaped base 16. The height of the truncated triangle 15 is smaller than the depth of the thread 6 so that its apex 18 is wider than the apex 7, as clearly shown in Fig. 2, in order to insure a wedge-like bearing of both sides of the wire simultaneously against the side walls of the thread groove of the female member. Furthermore, the radius $r_1$ of the wire-segment 16 is slightly smaller than the radius $r_2$ of the segment-shaped thread 11 of the male member. This is done in order to insure that the wire coil will not be gripped in a wedge-like manner in the thread groove of the male member so that it cannot be displaced in the female threaded member by any movement of the male threaded member when the latter is either inserted or removed. A further effect of having radius $r_1$ of the wire segment 16 slightly smaller than radius $r_2$ of the segment-shaped thread 11 is that with either tight or loose thread fits the male member will contact the wire coil near the bottom surface and any pressure between the male member and the wire coil will therefore tend to force the latter more firmly into the female thread groove.

In a high strength screw connection of the type described, a definite relationship between the various elements is necessary to obtain the maximum efficiency and to provide the maximum strength as described in my aforementioned co-pending application. The strength of the thread in the female member depends both on the shear strength of the metal at the root 19 of the thread and on the compressive strength of the thread groove sides as determined by the depth $c$ of the thread. Since the unit shear strength of the material used for the female threaded parts is generally about .6 times the compressive strength, the proper balance between the shear strength and the compressive strength of the thread 6 in the female threaded member is obtained by making thread depth $c$ equal to about .6 times the thread pitch $p$. This results in the radial distance $b$, between the pitch cylinder 9 and the screw cylinder 20 being about .2 of the pitch $p$ with the 60° thread form employed for thread 6. Representing the screw diameter of 20 by length D and the pitch diameter of 9 by length P, then P is equal to D plus .4 of $p$. The above properties are important because a shallower thread would not provide sufficient bearing area in the female threaded member while a deeper thread would make the tapping operation more difficult without correspondingly increasing the shear strength at the base of the thread.

The segment-shaped thread groove 11 in the male thread member 2 results in a thread depth $a$ equal to about .3 of P. This shallow segment-shaped thread groove, when compared with other conventional thread groove forms, greatly increases the strength of the male threaded member, particularly under the action of impact or fatigue forces, but it requires certain particular physical properties in the threaded part with which it contacts, as explained hereinafter, to insure that thread seizure does not occur and that the load is distributed to all the contacting thread convolutions when an axial force is exerted on the screw connection. Furthermore, as stated hereinbefore, the thread groove of the male member is made slightly wider than the base of the wire cross-section in order to insure that the wire does not wedge in the male thread groove. It is advisable to select the radius of the male thread groove between 1% and 6% longer than that of the segment base of the wire with an average of about 3%. These differences in radii result in an initial narrow contact area between the wire coil and the male thread groove. With the proper choice of material for the wire coil, this initial narrow contact area spreads out under load to a wider bearing area without creating harmful concentrations of stress in the male thread member.

In my aforementioned co-pending application, I have shown that the coil is initially wound with the free diameter $e$ of the main body of the coil sufficiently greater than the diameter $g$ of the tapped hole 6 so that the spring pressure exerted will adequately hold the coil in the female threaded member after it is assembled into place.

I have found that diameter $e$ of the coil should preferably be the largest free diameter to which the wire will subsequently return when the coil is reduced to a diameter equal to diameter $g$ of the tapped hole, and in order for the wire to exert adequate spring pressure in the tapped hole, diameter $e$ should be from 6% to 14% greater than diameter $g$. This requires that the material of the coil wire have adequate tensile strength or spring properties.

To facilitate assembly of the coil the entering convolution 23 is made with diameter $f$ slightly smaller than the diameter $g$ of the thread groove 6. The entering coil is provided with a tang 24 which may be engaged by a suitable tool to insert the coil into the female thread groove. By gripping the coil at the entering end, the friction between the coil and the thread groove causes the remaining convolutions of the coil to be reduced in diameter so that the entire coil can be readily screwed into place. After insertion, the tang on the entering convolution may be removed by cutting or breaking it off by turning the inserting tool with sufficient force in the reverse direction, since a reverse torque applied to the entering coil of the insert causes the convolutions to expand and to wedge firmly in the female thread groove. However, when this thread connection is used as a spark plug insert of an engine cylinder, it is not advisable to break off the entering tang of the coil in this manner, since in this case it is desirable for heat dissipating reasons that the coil be in intimate contact with the female thread groove along its entire length. The entering convolution 23, being somewhat smaller in diameter, exerts no spring pressure against the thread groove. The notch 25 is therefore provided at a point approximately opposite the tang on the entering convolution and after the wire is assembled in place this entering convolution is broken off at the notch by grasping the tang 24 with a small diameter slotted rod and twisting it back and forth a number of times. This method of removing the entering convolution allows the edges of the break to be embedded in the female thread. The other or trailing end of the coil wire may be tapered at 26. This tapered end will provide a beveled edge that will facilitate assembly of the male member into the coil. It also forms a sharp point that tends to enter into the material of the female member thereby increasing the resistance to any force that might tend to back the coil out of the female thread.

In making the connection, the spark plug hole in the cylinder on the bolt hole in the female member is tapped so as to form the female thread and to bring the lands 8 to accurate measure. In this tapping operation the pitch line 9 of the thread groove 6 is carefully controlled by accurately fixing the pitch diameter P. The wire coil is then assembled in place, as previously described, and the springing action of the wire wedges the coil into the female thread with sufficient force that the coil and the female member are inseparable for all practical purposes against any force that might be applied during inserting or removing the male threaded member.

This wedging action also prevents any undesired movement of the coil relative to the female member when the connection is under normal working forces or vibrating loads.

In the manufacture of the wire coil, the cross-section of the wire is accurately controlled, especially as regards to distance $h$, the height from the pitch line 9 to the base of the wire segment 21. By controlling this dimension of the wire section together with the pitch diameter $P$ of the tapped hole, the minor diameter $d$ of the insert assembled into the tapped hole is controlled and kept uniform.

Figure 8:
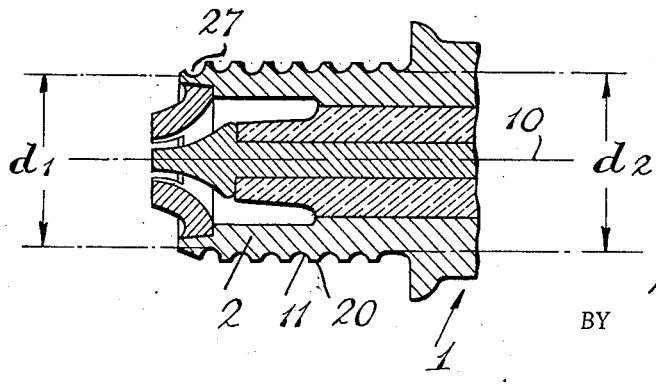
Fig. 8 shows a section through the threaded portion of the male screw member.

The type of fit between the spark plug or other male threaded member and the coil is governed by the minor diameter $d_2$ of the thread groove convolutions on the main body of the male threaded member, see Fig. 8. The minor diameter $d_1$ of the entering thread convolution at the male thread member is smaller than diameter $d$ of the tapped hole and slightly smaller than diameter $d_2$ of the remaining thread convolutions in order to facilitate entry of the male member into the threaded hole, particularly when diameter $d_2$ of the male member is made equal to or slightly larger than diameter $d$ of the insert assembled in the tapped hole. For screw connections where easy assembly and disassembly is required, diameter $d_2$ is generally made equal to or slightly smaller than diameter $d$. For assemblies where a firm connection is desired which will offer adequate resistance to unscrewing, diameter $d_2$ is made larger than diameter $d$ so that there is a definite interference fit between the base of the male thread groove and the wire of the coil assembled in the tapped hole.

The wire coil material must have certain definite physical properties to best fulfill its functions. The wire must be capable of being produced to accurate size and shape; it must have a smooth, polished surface; it must have adequate tensile strength or spring characteristics combined with good ductility and cold flowing properties, it must have good bearing, anti-seizing and anti-frictional qualities, particularly with respect to the material of the male threaded member; it should have a co-efficient of expansion approximating that of the female threaded member; and it should not subject the connection to electrolytic phenomena due to differences in the electric potentials of the contacting materials which may set up galvanic currents that have a corrosive or decomposing effect on the materials. I have found that it is generally desirable to control the strength or hardness of the wire to various values depending upon the strength of the material used for the male and female threaded member and also upon the type of screw fit desired. Where a loose or free fitting screw connection is employed, a wire of great hardness and wear resistance is generally desirable. Where a tight fitting screw connection is used, it is generally desirable that the yield point strength of the wire be less than that of the male screw material so that the wire will deform where it contacts the male screw under heavy pressure. Reducing the yield point strength of the wire and increasing its ductility also decreases the strain in the female threaded member when a tight fitting screw fit is used so that lower strength and more ductile wire should be employed in the softer and weaker boss materials.

Figure 1:
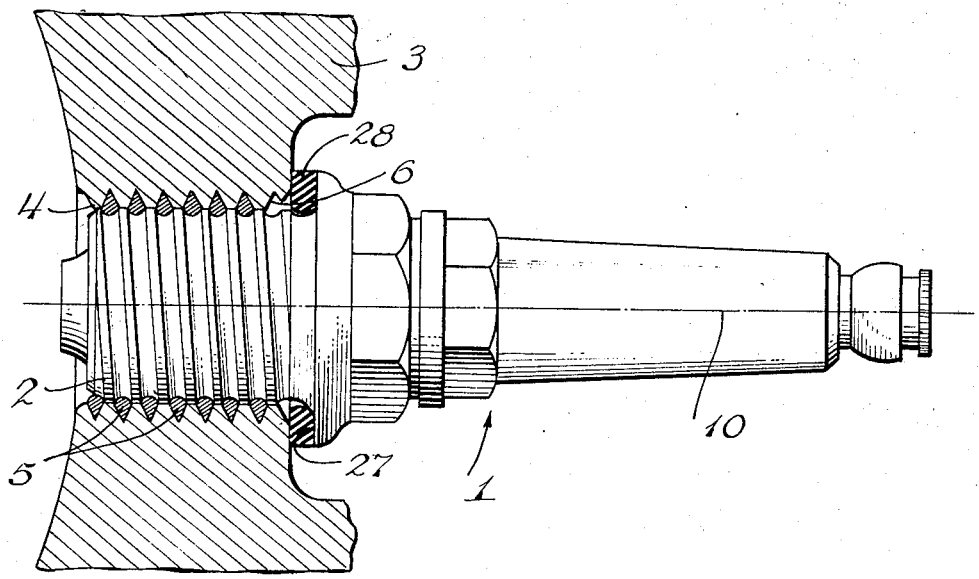
Fig. 1 is an elevation partly in section of a spark plug fastened to an engine cylinder with the aid of a screw connection according to my invention.

The physical properties of the wire are controlled by the chemical composition of the material, by cold working the wire in reducing it to size, and by heat treatment. I have found that phosphor bronze wire can be cold worked or drawn to have the required properties of adequate strength and hardness combined with ductility, and that this material has very satisfactory anti-frictional and anti-seizing properties with respect to steel or aluminum. The bronze wire also has a co-efficient of expansion approximating that of the aluminum boss material so that it is a very effective material for use with steel screws in light alloy bosses as stated in my aforementioned co-pending application. However, in the presence of moisture, bronze wire in contact with aluminum sets up electric potentials that cause currents to flow. Such currents corrode the boss material so that when a bronze wire insert is used it is necessary to see that no moisture can enter the screw joint. An application of grease or oil will help to protect the screw connection from the entrance of moisture, but to insure best protection against corrosion, I have found it desirable to plate the bronze wire with cadmium, zinc or chromium. Although the bronze wire insert normally has good anti-seizing characteristics in regard to a steel male screw member, nevertheless in a spark plug screw connection, as shown in Fig. 1, the high heat and pressure to which the joint is exposed tends to cause the male screw to seize to the insert with sufficient force to prevent subsequent removal of the spark plug. The resistance to seizing of the wire to the male screw can be increased by chromium plating the inner surface of the wire coil, this plating forming an adherent coating on the bronze that is particularly effective against seizing to steel.

When my screw connection is used in aluminum, and better protection against corrosion than is obtained with the bronze insert is desired, I have found that austenitic steel, and more particularly a steel containing about 18% chromium and 8% nickel, is a suitable material. This material has the same co-efficient of expansion as bronze and it can be cold worked to high strength and still maintain adequate ductility. It does not have quite as good anti-frictional qualities as the hard drawn bronze and it is therefore not quite as suitable for tight fitting screw connections where the pressure against the wire is sufficiently great to cause plastic deformation of the wire material. For the usual free fitting screw connections the anti-frictional qualities of this austenitic steel wire is generally adequate and I have found that this quality can be further improved by cadmium or chromium plating the wire.

Other suitable materials for certain applications are nickel, and high nickel alloy wires such as known under the trade names Monel and Inconel. These materials have good anti-corrosive properties, particularly in contact with aluminum and magnesium alloys, and also have excellent anti-seizing properties in respect to steel so that they will be particularly suitable for spark plug inserts and similar connections.

In certain screw connections, as for instance in the connection of a spark plug to a cylinder of an engine, it is required that heat be conducted from one member to the other. It is well-known that in conventional screw connections, particularly when the spark plug and the cylinder are of dissimilar materials, only a few convolutions of the thread of the one member are in intimate contact with the corresponding convolutions of the thread of the other member due to the different changes in thread pitch that occur in the dissimilar materials at the high operating temperatures. Furthermore, only one flank of each contacting thread convolution is indeed in active contact which further decreases the heat conductivity of the joint. Contrary thereto, the connection in accordance to my present invention offers much better conditions. The spark plug body, being screwed into the convolutions of the coil 5, bears with the bottom of all the thread grooves against the segment-shaped base portion of the entire length of the wire, urging the wire thereby into the triangular thread groove of the cylinder so as to bear wedge-like against both flanks of the groove and thus insuring good thermal contact between the wire coil and the cylinder. In tightening up the spark plug, when the face 27 of the plug contacts the cylinder or gasket 28 an axial force is created along the thread which sets up a high unit pressure at the base of the wire segment and causes sufficient deformation in the wire to create a bearing surface along the side of the segment of sufficient area to support the axial force. Due to the ductility of the wire and the intensity of the contact pressure set up in this manner at the base of the coil segment, the axial force is supported by all the convolutions of the thread and good thermal conductivity is obtained between the wire and the spark plug even under the varying thermal expansion conditions that occur with changes in temperature. While I have found that this high unit bearing pressure between the sparkplug and the insert insures good heat conductivity, heat is also transmitted directly between the male and female members through the lands 8 and 12 that are located between the thread convolutions. It is therefore desirable to maintain the clearance between these lands at a minimum or even to allow them to contact each other.

A screw connection of the type described is useful for every purpose wherever high stresses are to be considered or where a tight fitting thread assembly is employed. It is applicable without regard to the material of the male and the female members, but it is most advantageous in cases where in the conventional screw connection the danger arises that the members seize together on the thread surface. Such thread seizure with conventional threads is often experienced when tight fitting threads are screwed together or even with highly stressed fittings screw seizure sometimes occurs due to the loads in the threads and the vibrations and heat conditions experienced in service. Thus, the novel connection is particularly valuable if a male member is to be secured to the female member with a tight thread fit since the good bearing qualities and anti-frictional characteristics of the wire thread insert combined with the ductility and plasticity of the insert material under high unit loads allow the tight fitting male member to be screwed into the female member without seizure or abrasion of the thread surface; in consequence thereof uniform tight fits are obtained depending upon the amount that diameter $d_2$ is greater than diameter $d$ and with my connection the tightness of the thread fit is not noticeably affected by the material of the female thread member. Thus tight fitting male members of iron or steel can be firmly secured to a female member of a soft metal, e. g., aluminum, and also to a female member of iron or steel. My screw connection is of advantage in this respect even with highly loaded free fitting screws where the male and female thread members are made of the same material and therefore have a tendency to weld together under load, and I have therefore found it useful for connecting steel screws to steel bosses, aluminum screws to aluminum bosses, etc.

In a connection of this type, I have found that the size or cross-section of the wire should bear some relation to the diameter of the screw in order that sufficient elastic force be available in the wire coil so that the elastic action of the coil will hold it securely in the female thread groove. Suitable wire proportions are obtained by making the pitch of the thread $p$ from 12% to 24% of the nominal screw diameter $d$. Furthermore, when tight fitting screws are employed, I have found that the diameter $d_2$ of the male thread member can be made larger than the diameter $d$ of the insert assembled in the tapped hole by an amount equal to 5% to 15% of the thread pitch $p$, and that when such an enlarged tight fitting male member is screwed into place the material of the thread insert is swedged out to completely fill the groove 11 of the male member and also to fill the spaces between the lands made by rounding the corners 13 and 14 and the space left between the apex 18 of the wire and the bottom 7 of the thread groove. After all these spaces have been filled up the further reduction in section of the wire elongates it so that the entering end of the coil is moved forward slightly during the insertion of the tight fitting male screw member. Due to this plasticity of the wire insert, no permanent deformation takes place of the thread groove of the male or female members so that with my thread connection if it becomes necessary to unscrew the thread connection and to again reassemble it with the same tight fit, this can be accomplished in the same tapped hole with a screw of the same size as that initially employed by removing the original insert and replacing it with one of the same size. This is an important feature where tight fitting screws must be serviced as it avoids the necessity of having special oversized screws to replace those that are removed in overhaul or when servicing.

What I claim is:

1. A tight fitting screw connection comprising in combination a male screw member, with an approximately segment-shaped thread groove, a female member with an approximately V-shaped thread groove, and a coiled wire of a springy material, insertable in the thread grooves of said male and said female members, the cross-section of the wire having approximately the form of a truncated triangle converging at an angle equal to that of the V-shape of the thread groove of the female member, the radius of said segment-shape of the groove in the male member being up to 6% greater than that of said segment-shaped base of the wire cross-section, the wire being initially wound with an external diameter greater than the corresponding thread diameter of the female member, and the coiled wire when sprung in the thread of the female member having an innermost diameter slightly smaller than the root diameter of the thread groove in the male member, whereby the wire will be forcibly wedged into the thread of the female member and may be deformed at its base portion so as to fill substantially the cross-section of the thread groove of the male member, when the latter is screwed into the wire coil.

2. In a screw connection of a male and a female member, a V-shaped thread groove in the female member and a rounded thread groove in the male member, the thread groove in the male member being considerably shallower than that of the female member and its cross-section being less than a semi-circle, a coil of a wire having a cross-section with an outer portion of V-shape whose angle corresponds to that of the thread groove of the female member, and with a rounded inner portion, said rounded portion being so formed in relation to the shape of the groove of the male member as to bear substantially on the bottom of said groove substantially without wedging action upon the external side portions of the groove, and the diameters of said threads and of said wire coil being so selected in relation to each other that when the male member is screwed into the wire coil inserted into the female member, the male member exerts a pressure upon the coil so as to wedge the wire into the thread of the female member.

3. A screw connection according to claim 1 wherein the wire coil is made of a material selected from the group of metals which consists of stainless steel, austenitic steel, hard drawn bronze, nickel and high nickel alloys having a hardness and strength similar to and a co-efficient of expansion greater than those of the male member.

4. A screw connection according to claim 2 wherein the wire coil consists of a hard drawn bronze plated with a metal which forms a protective coating against corrosion of the material of the female member.

5. A screw connection according to claim 2 wherein the wire coil consists of a hard drawn wire and wherein the inner portion of the coil is plated with chromium.

6. A screw connection of a sparkplug including a sparkplug body with an engine cylinder of aluminum or magnesium alloy, comprising in a hole of said cylinder a female thread of V-shaped cross-section of the thread grooves, with first lands between the individual thread groove convolutions, another thread of a pitch equal to that of the female thread on the sparkplug body, said other thread including a groove of approximately segment-shaped cross-section and second lands between the individual convolutions of said other thread groove, a wire coil, the cross-section of the coil wire constituting approximately a truncated triangle with sides converging at an angle equal to that of said V-shaped groove cross-section on a segment-shaped base the radius of which is smaller than that of the segment-shape of said other thread groove, the wire being initially coiled with an external diameter slightly greater than the corresponding diameter of the thread of the female member, the innermost diameter of said wire coil when inserted into said female thread fitting closely the root diameter of the thread on the sparkplug body, and the inner diameter of the lands of the female thread fitting closely the outer diameter of the lands of the thread on the sparkplug body.

7. A screw connection according to claim 2 wherein the radius of the segment-shaped base of the wire cross-section is up to 6% smaller than the radius of the segment-shape of the thread groove on the spark plug, and wherein the edges of the lands are rounded off, whereby space is created for the wire to deform substantially without wedging in the thread groove of the sparkplug body.

8. A screw connection according to claim 6 wherein the first or entering convolution of the wire coil is provided with a tang at its end, and is notched at a point remote from said end so as to cause a break at a predetermined point when the tang is removed after the insertion of the coil in the female thread of the connection.

9. A screw connection according to claim 2 wherein the trailing end of the wire coiled is tapered.

10. A screw connection as claimed in claim 1 wherein the root diameter of the thread on the male member is greater than the innermost diameter of the insert assembled in the hole by an amount equal to 5% to 15% of the thread pitch.

HAROLD CAMINEZ.